Dec. 26, 1967  F. H. JAMES, JR., ET AL  3,360,019
PROCESS FOR FILLING CONTAINERS WITH VISCOUS MATERIAL
Original Filed Sept. 16, 1963  2 Sheets-Sheet 1

INVENTOR.
FORREST H. JAMES, JR.
ELDRIDGE H. COCKRELL
THOMAS D. NIXON

ATTORNEYS

Dec. 26, 1967 F. H. JAMES, JR., ETAL 3,360,019
PROCESS FOR FILLING CONTAINERS WITH VISCOUS MATERIAL
Original Filed Sept. 16, 1963 2 Sheets-Sheet 2
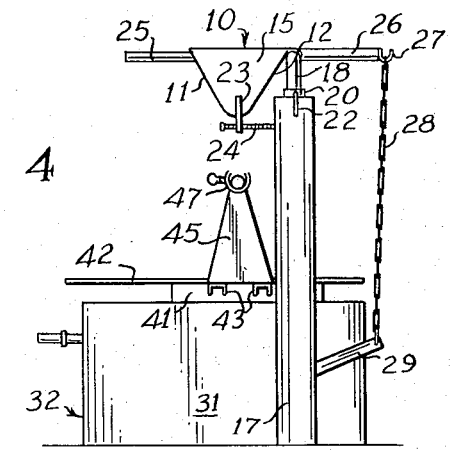
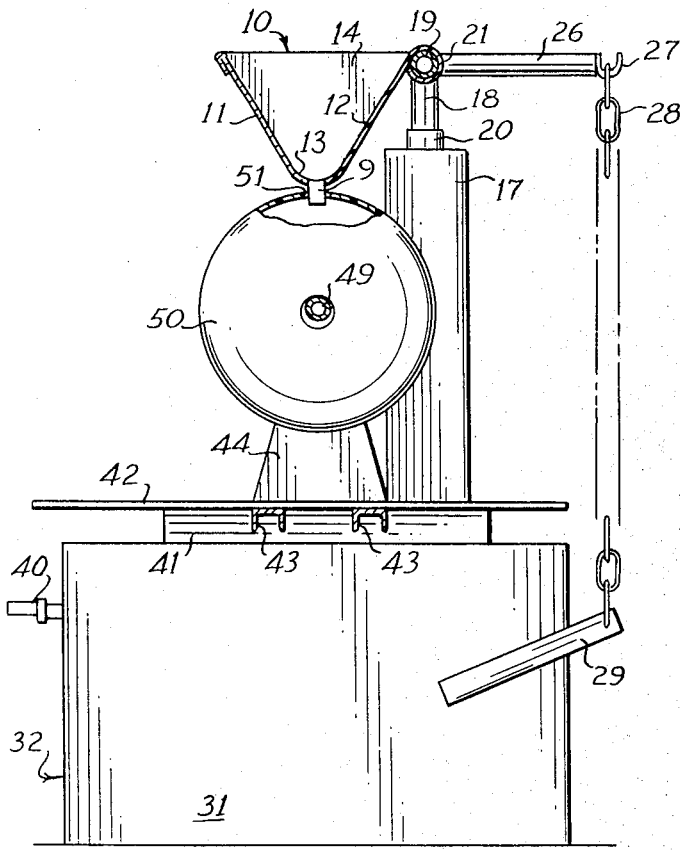
INVENTOR.
FORREST H. JAMES, JR.
ELDRIDGE H. COCKRELL
THOMAS D. NIXON
*Newton, Hopkins,
Jones & Ormsby*
ATTORNEYS

United States Patent Office 3,360,019
Patented Dec. 26, 1967

3,360,019
PROCESS FOR FILLING CONTAINERS WITH VISCOUS MATERIAL
Forrest H. James, Jr., Opelika, Eldridge H. Cockrell, Auburn, and Thomas D. Nixon, Opelika, Ala., assignors to Diversified Products Corporation, Opelika, Ala., a corporation of Alabama
Original application Sept. 16, 1963, Ser. No. 308,975, now Patent No. 3,270,390, dated Sept. 6, 1966. Divided and this application June 27, 1966, Ser. No. 560,554
3 Claims. (Cl. 141—12)

ABSTRACT OF THE DISCLOSURE

A process of simultaneously filling a plurality of barbell weight shells with cement comprising storing a mass of the cement in a trough defining openings in its bottom surface, inserting a bar through the central openings of a plurality of shells and supporting the shells below the trough, positioning the peripheral opening of each shell directly below an opening in the trough, lowering the trough to a point where the nozzles of each of its openings project into the peripheral openings of the shells, vibrating the mass of cement in the trough with a vibrating rod to induce the cement to flow through the openings of the trough, and vibrating the bar and shells to induce the cement to settle in the shells.

Cross-reference to related applications

This application is a division of our co-pending application, Ser. No. 308,975, now Patent No. 3,270,390 entitled "Dispenser," filed Sept. 16, 1963.

Background of the invention

In the manufacture of barbell sets, it has been found desirable when producing weights for the barbell sets to introduce concrete or other heavy aggregate material through a small opening in the periphery of a hollow thermoplastic casing until the aggregate material fills the hollow portion of the casing. In the past this operation has been slow and tedious. For example, we first attempted to fill the casings by pumping the slurried mixture of aggregates, cement and water into a manifold and thence through spouts to the hollow portions of the casings. This did not prove successful, even though pressures approaching 600 p.s.i. were employed. Instead of filling the casings uniformly, the slurry, in many instances, simply blocked certain of the spouts. Also, the incoming slurry blocked the egress of air from the casing, the air, in turn, blocking the entry of additional slurry into the casing.

Next, we attempted to vibrate, simultaneously, the casing and a trough containing the aggregate and having a plurality of spouts which lead to the casings. This too did not prove successful since the slurry would not feed fast enough and the vibrating spouts would tear the casings into which they protruded.

Summary of the invention

Briefly described, the present invention, which obviates the difficulties described above, includes a pivotally supported trough which receives the slurried aggregate material. The bottom of the trough is provided with a plurality of spouts which, when the trough is lowered to a discharge position, protrudes into the holes in a plurality of disc shaped hollow casings disposed in juxtaposition on a common shaft extending beneath the trough. The end portions of the shaft are carried by brackets which extend up from a primary vibrator. The trough may be raised or lowered by means of a crank mechanism. The machine also includes a pair of secondary vibrators which project into the trough from opposite ends thereof for vibrating the aggregate material, the secondary vibrators being movable axially of the trough.

Accordingly, it is an object of the present invention to provide process for quickly, efficiently and inexpensively filling casings with aggregate material.

Other objects, features and advantages will become apparent from the following description when taken in conjunction with the accompanying drawings wherein like characters of reference designate corresponding parts throughout the several views and wherein:

Brief description of the drawing

FIG. 4 is an end elevational view of the dispenser shown in FIG. 1.

FIG. 5 is a cross-sectional view taken along line 5—5 in FIG. 1.

Disclosure of an embodiment

Figure 1:
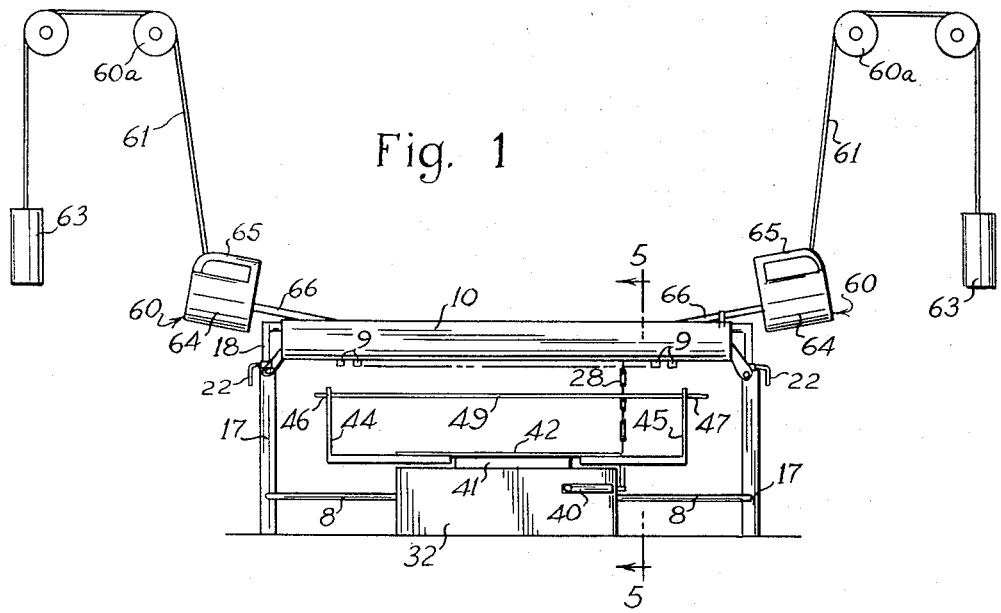
FIG. 1 is a front elevational view of a dispenser constructed in accordance with the present invention, the trough thereof being shown in its lowered position feeding aggregate material into a plurality of plastic casings disposed beneath the trough.
Figure 2:
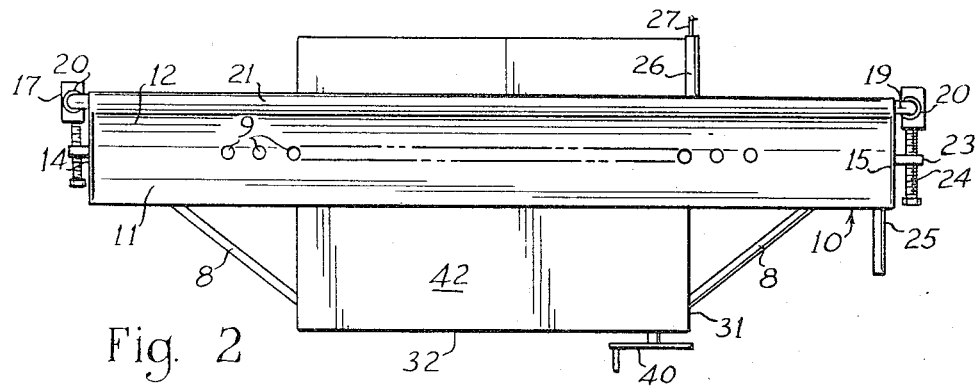
FIG. 2 is a top plan view of the dispenser shown in FIG. 1.
Figure 3:
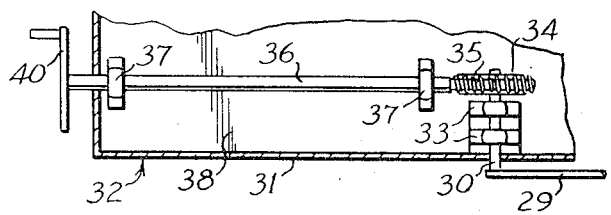
FIG. 3 is an enlarged horizontal sectional view of a portion of the vibrator housing of the present invention and showing the crank mechanism supported thereby.

Referring now in detail to the embodiment chosen for the purpose of illustrating the present invention, it being understood that in its broader aspect, the present invention is not limited to the exact details herein depicted, numeral 10 denotes generally the trough of the present invention. The trough 10 has a rectangular upper edge and side walls 11 and 12 which taper downwardly, the side walls 11 and 12 being joined at their lower ends by a bottom wall 13. The trapezoidal ends 14 and 15 complete the trough 10 by joining the ends of side walls 11 and 12 with the bottom 13. The bottom 13 of trough 10 is provided with a plurality of filling spouts 9, which are equally spaced in longitudinal alignment. Each spout 9 is a hollow cylindrical member open in both ends and communicating with the interior of the trough 10. The spouts 9 project downwardly from the bottom 13, each spout 9 being fixed to the bottom by its upper end.

For supporting the trough 10, a pair of opposed upstanding standards 17 are provided, the lower ends of standards 17 resting upon the floor (not shown). The upper ends of standards 17 are respectively provided with upstanding cylindrical arms 18, the upper ends of which are joined by a cylindrical, horizontally extending, pivot bar 19. The arms 18 are slideably carried in the standards 17, and are respectively provided with an adjustable collar 20 which limits the downward movement of the arm 18, the collar 20 having set screws 22 threadedly carried thereby for engaging arms 18.

One edge portion of the upper edge of side wall 12 is wrapped loosely around the pivot bar 19 to provide a pivot sleeve 21 which journals pivot bar 19. Thus, the trough 10 may be raised or lowered in an arcuate path, pivoting about the horizontally disposed pivot bar 19. Furthermore, the effective height of trough 10 may be varied i.e., raised or lowered, by loosening the set screws 22 in collars 20 to permit relocation of the collars 20. Thereafter, of course, the set screws 22 are tightened to again fix the position of collars 20, respectively, with respect to the arms 18.

For limiting the downward pivotal movement of trough 10, longitudinal outwardly protruding braces 23 extend sidewise respectively from ends 14 and 15 of the trough 10. Transverse bolts 24 threadedly protrude respectively through braces 23 toward standards 17 so as to engage the standards 17 at positions spaced below the axis of pivot of the trough 10 when the trough is lowered.

Projecting forwardly from side wall 11 is a handle 25 by means of which the trough 10 may be manually lifted for movement in its arcuate path.

Midway between the standards 17 and supported by the floor is a vibrator housing 32. The purpose of the vibrator housing 32 is to support a crank mechanism for raising and lowering the trough 10 and for carrying the primary vibrator, namely the vibrator mechanism for the casings 50 which are to be filled. The housing 32 is rigidly fixed between standards 17 by bracing bars 8 which respectively extend inwardly from standards 17 and are secured to the opposite end walls, such as wall 31.

As a part of the crank mechanism, a lever 26 protrudes rearwardly from side wall 12 and is provided at its outer end with an upwardly opening hook 27 for receiving one end of a chain 28, the other end of which is connected to one end of lever 29. The other end of lever 29 is fixed on stub shaft 30 which protrudes outwardly from an end wall 31 of vibrator housing 32. Shaft 30 is journaled by the pillow block 33 carried by the end wall 31 on the inside of housing 32.

On the inner end of shaft 30 is a cog wheel 34 which meshes with a worm gear 35 carried on one end of a crank shaft 36. The shaft 36 is carried by pillow blocks 37 mounted on the bottom 38 of housing 32. The other end of shaft 36 protrudes outwardly through one side wall of housing 31 and is provided at its outer end with a crank 40 by means of which the shaft 36 may be rotated to thereby rotate, via worm gear 35, cog wheel 34, and stub shaft 30, the radially extending lever 29.

It is now seen that when the end of chain 28 is looped over the hook 27, the manipulation of crank 40 will result in raising or lowering the trough 10.

Within the housing 32 is a primary vibrator 41, known in the trade as a "Syntron Vibrator." Vibrator 41 has a flat, horizontally disposed, top plate 42 which protrudes above the upper edge of the housing 32 and upon actuation of vibrator 41, is itself vibrated with respect to the housing 32.

Secured to the top plate 42 are a pair of spaced, parallel, longitudinally extending, cross bars 43, the ends of which protrude on opposite sides beyond the housing 32 and toward the standards 17. The ends of cross bars 43 carry upstanding opposed brackets 44 and 45 which respectively are provided with toggle clamps 46 and 47. Clamps 46 and 47 are adapted to receive therebetween a casing supporting bar 49 on which are disposed, in coaxial relationship, a plurality of juxtaposed hollow disc shaped casings 50 which are to receive the aggregate material from trough 10.

Each casing is a hollow cylindrical member having opposed side walls and a central hole through which the bar 49 protrudes. The periphery of each casing 50 is provided with a filling hole 51 through which the aggregate material is fed to the casing 50.

The casings 50 are so disposed on bar 49 that each hole 51 thereof is arranged uppermost in alignment with a filling spout 9 so as to receive therein the spout 9. Thus, it will be seen that the spouts 9 must be spaced apart by a distance greater than the width of a casing 50 such that all casings 50 when respectively receiving the spouts 9 are themselves spaced apart along the longitudinally horizontally disposed bar 49.

The secondary vibrator mechanism includes a pair of concrete vibrators denoted generally by the numerals 60. Vibrators 60 are respectively suspended by cables 61 from a pulley 60a disposed over the ends 14 and 15 of trough 10. The cables 61 are, in turn, provided with counter weights 63. Each vibrator 60 is a vibrator of the type, known in the trade as a "Stow Concrete Vibrator," and includes a vibrator motor 64 having a handle 65 and a long vibrator rod 66 which extends from the motor 64.

In operation, the casings 50 are arranged on bar 49, in an amount corresponding to the number of spouts 9. Each casing 50 should be of the same size, even though any particular batch of casings may be of a size different from the next batch. Next the end portions of bar 49 are mounted in clamps 46 and 47 and clamped in place. At this stage, it will be understood that the trough 10, through manipulation of crank 40, is held in a raised condition such that the spouts 9 are above the casings 50.

After the bar 49 is in place, disposed below trough 10, the casings 50 which are loosely carried by the bar 49 may be readily rotated or moved axially of bar 49. Thus, each casing is so positioned that its hole 51 is adopted to receive a spout 9 upon lowering of the trough 10.

Thereafter, the trough 10 is lowered by manipulation of the crank 40 so that all spouts 9 protrude into the holes 51 is the casings 50. At this stage, the bolts 24 are manipulated to position the bottom 13 of trough 10 slightly above the peripheries of all casings 50. Thus, while the spouts 9 protrude into the casings 50, no weight of the trough 10 is carried by the casings 50. The crank 40 is then further manipulated to loosen chain 28 and permit it to be removed from hook 27.

The aggregate material in a slurried condition and having the consistency of cement in fluid condition is fed into the trough 10 and the rods 66 of concrete vibrators 60 placed on the trough 10 with their motors 64 disposed outwardly of the ends 14 and 15 of trough 10. Thereafter, all vibrators are actuated. Vibrator 41 imparts a vibration via bar 49 to the casings 50 while vibrators 60 vibrate the aggregate material. During this filling operation, the vibrators 60 are moved manually in longitudinal directions, even though suitable mechanisms may be employed, if desired, for moving the vibrators 60 with respect to the trough 10.

As the two separate vibrating systems, namely vibrator 41 for the casings 50 and vibrators 60 for the aggregate material, the aggregate material readily flows through spouts 9 and into the casings 50.

After the casings 50 are filled, as evidence by small amounts of the aggregate material overflowing from the casings 50, the chain 28 is reinstalled on hook 27 and the crank 40 manipulated for raising the trough 10. The clamps 47 and 48 are released and bar 49 lifted and transported to a rack where plugs (not shown) are installed on the casings 50 for closing holes 51.

In the event larger or smaller casings or containers, such as casings 50 are to be filled, the height of trough 10 may be varied by varying the positions of collars 20, it being desirable to position collars 20 and the stops i.e., bolts 24, so as to position the trough 10 essentially horizontally when the trough 10 is in its lowered position.

The trough 10 serves as a storage zone for the viscous aggregate material while the secondary agitators namely vibrators 60 serve to vibrate the viscous aggregate material without imparting any appreciable vibration to trough 10, i.e., vibration sufficient for the spouts 9 to tear the material surrounding the peripheral holes 51. The spouts 9 prescribe predetermined paths along which the aggregate material is fed by gravity. The clamps 46 and 47 firmly grip the bar 49 in place so that a vibratory force is imparted to the casings 50 while the spouts 9 present appreciable axial movement of the casings 50 thereon.

It will be obvious to those skilled in the art that many variations may be made in the embodiments chosen for the purpose of illustrating the present invention without departing from the scope thereof as defined by the appended claims.

We claim:

1. A method of simultaneously filling a plurality of containers with a viscous material through a small opening in each container comprising:

storing a mass of the viscous material in a substantially horizontally disposed trough having dispensing openings in its bottom surface, positioning a plurality of containers below the trough, selectively moving each container along the length of the trough so that its opening communicates with one of the dispensing openings of the trough, and simultaneously vibrating the containers and the viscous material in the trough to induce the viscous material to flow through the holes of the trough and the holes of the containers and settle in the containers.

2. The invention of claim 1 further comprising the step of moving the trough in a downward direction to establish communication between the opening of the trough and the openings of the container, and wherein the step of vibrating the viscous material comprises inserting at least one elongate rod into the trough in a direction generally longitudinally of the trough and vibrating the rod.

3. A method of simultaneously filling a plurality of hollow annular barbell weight shells of the type defining a small peripheral opening therein with a viscous cementitious substance comprising:

storing a mass of the cementitious substance in an elongate trough having dispensing openings in its bottom surface, inserting a bar through the central opening of a plurality of shells and supporting the shells beneath the trough, positioning the shells along said bar such that their respective openings are registered with the dispensing openings of the trough, simultaneously vibrating the cementitious substance in the trough to urge the cementitious substance through the dispensing openings of the trough and vibrating the bar to transmit vibrations to the shells carried thereby to urge the cementitious substance to settle inside the shells.

References Cited

UNITED STATES PATENTS

| 283,313 | 8/1883 | Wiltse | 141—74 |
| 2,698,475 | 1/1955 | Davis | 264—71 |
| 2,795,990 | 6/1957 | Bohlman et al. | 141—12 X |

FOREIGN PATENTS

| 38/4,774 | 4/1963 | Japan. |
| 563,454 | 9/1958 | Canada. |

LAVERNE D. GEIGER, *Primary Examiner.*

E. J. EARLS, *Assistant Examiner.*